US011870381B2

(12) United States Patent
Reddy et al.

(10) Patent No.: US 11,870,381 B2
(45) Date of Patent: Jan. 9, 2024

(54) MULTIPHASE INDUCTION MOTOR DRIVE FOR GEARLESS ELECTRIC VEHICLES

(71) Applicant: QATAR UNIVERSITY, Doha (QA)

(72) Inventors: B. Prathap Reddy, Pradesh (IN); Atif Iqbal, Doha (QA); Mohammad Meraj, Telangana (IN); Syed Rahman, Telangana (IN)

(73) Assignee: QATAR UNIVERSITY, Doha (QA)

( * ) Notice: Subject to any disclaimer, the term of this patent is extended or adjusted under 35 U.S.C. 154(b) by 0 days.

(21) Appl. No.: 17/571,160

(22) Filed: Jan. 7, 2022

(65) Prior Publication Data
US 2022/0224273 A1  Jul. 14, 2022

Related U.S. Application Data

(60) Provisional application No. 63/135,388, filed on Jan. 8, 2021.

(51) Int. Cl.
| | | |
|---|---|---|
| *H02P 27/12* | (2006.01) |
| *H02P 21/08* | (2016.01) |
| *B60K 1/00* | (2006.01) |
| *B60K 17/02* | (2006.01) |
| *B60L 53/20* | (2019.01) |

(52) U.S. Cl.
CPC ............. *H02P 27/12* (2013.01); *B60K 1/00* (2013.01); *B60K 17/02* (2013.01); *B60L 53/20* (2019.02); *H02P 21/08* (2013.01); *H02P 2207/01* (2013.01)

(58) Field of Classification Search
CPC ...... H02P 27/12; H02P 21/08; H02P 2207/01; B60L 53/20; B60K 1/00; B60K 17/02
See application file for complete search history.

(56) References Cited

U.S. PATENT DOCUMENTS

| | | |
|---|---|---|
| 4,477,760 A | 10/1984 | Kuznetsov |
| 5,977,679 A | 11/1999 | Miller et al. |
| (Continued) | | |

FOREIGN PATENT DOCUMENTS

JP  2014-39446 A  2/2014

OTHER PUBLICATIONS

Michele Mengoni et al., "High-Torque-Density Control of Multiphase Induction Motor Drives Operating Over a Wide Speed Range", IEEE Transactions on Industrial Electronics, vol. 62, No. 2, Feb. 2015, 12 pages.

(Continued)

*Primary Examiner* — Zoheb S Imtiaz
(74) *Attorney, Agent, or Firm* — SQUIRE PATTON BOGGS (US) LLP

(57) ABSTRACT

A Pole Phase Modulated (PPM) nine-phase induction motor drive may be used in gearless electric vehicle applications. A single stator winding multiphase induction motor may deliver variable speed-torques by varying the number of phases and poles with respect to a multiphase power converter. A multilevel inverter controlled with carrier phase shifted space vector pulse width modulator (PWM) may further improve the PPM based multiphase induction motor (MIM) drive with respect to efficiency, torque ripple, and direct current (DC) link utilization. To operate the PPM based MIM drive smoothly in different pole phase combinations, indirect field oriented vector control may used.

19 Claims, 12 Drawing Sheets

(56) References Cited

U.S. PATENT DOCUMENTS

| | | | |
|---|---|---|---|
| 6,242,884 | B1 | 6/2001 | Lipo et al. |
| 6,876,176 | B2 | 4/2005 | Stefanovic et al. |
| 2004/0046519 | A1* | 3/2004 | Leonardi ............... B60K 6/365 |
| | | | 318/432 |
| 2005/0279541 | A1* | 12/2005 | Peters ..................... B60L 50/52 |
| | | | 180/65.1 |
| 2008/0211432 | A1* | 9/2008 | Shkondin ............... B60L 50/52 |
| | | | 318/140 |
| 2010/0090629 | A1* | 4/2010 | Tang .................. B60L 15/2045 |
| | | | 180/65.285 |
| 2011/0169365 | A1* | 7/2011 | Galley ................. H02K 21/125 |
| | | | 310/156.02 |
| 2014/0346862 | A1* | 11/2014 | Winkler ................. B60L 53/14 |
| | | | 320/137 |
| 2019/0351895 | A1* | 11/2019 | Ben-Ari .................... B60K 6/26 |
| 2021/0328537 | A1* | 10/2021 | Iwaji ........................ B60L 3/00 |
| 2021/0336574 | A1* | 10/2021 | Toliyat .................... H02P 25/20 |

OTHER PUBLICATIONS

Ahmed Salem et al., "A Review on Multiphase Drives for Automotive Traction Applications", IEEE Transactions on Transporation Electrification, vol. 5, No. 4, Dec. 2019, 20 pages.

Masayuki Terashima et al., "Novel Motors and Controllers for High-Performance Electric Vehicle with Four In-Wheel Motors", IEEE Transactions on Industrial Electronics, vol. 44, No. 1, Feb. 1997, 11 pages.

Emil Levi, "Multiphase Electric Machines for Variable-Speed Applications", IEEE Transactions on Industrial Electronics, vol. 55, No. 5, May 2008, 17 pages.

E. Levi et al., "Multiphase Induction Motor Drives—a technology status review", IET Electr. Power Appl., 2007, 1, (4), pp. 489-516.

John W. Kelly et al., "Torque Control during Pole-Changing Transition of a 3:1 Pole Induction Machine", Proceeding of International Conference on Electrical Machines and Systems 2007, Oct. 8-11, Seoul, Korea, 6 pages.

B. Prathap Reddy et al., "A Single DC Source-Based Three-Level Inverter Topology for a Four-Pole Open-End Winding Nine-Phase PPMIM Drives", IEEE Transactions on Industrial Electronics, vol. 68, No. 4, Apr. 2021, 10 pages.

B S Umesh et al., "Performance Improvement of a Nine Phase Pole Phase Modulated Induction Motor Drive", 6 pages.

B. Prathap Reddy et al., "Multilayer Fractional Slot Pole-Phase Modulated Induction Motor Drives for Traction Applications", IEEE Transactions on Industrial Electronics, vol. 67, No. 11, Nov. 2020, DOI:10.1109/TIE.2019.2958287, 8 pages.

B. Prathap Reddy et al., "A Five speed 45-Phase Induction motor Drive with Pole Phase Modulation for Electric Vehicles", Indian Institute of Technology Hyderabad, Department of Electrical Engineering, downloaded on Mar. 31, 2023, 6 pages.

John W. Kelly et al., "Multiphase Space Vector Pulse Width Modulation", IEEE Transactions on Energy Conversion, vol. 18, No. 2, Jun. 2003, 6 pages.

B. Prathap Reddy et al., "A Fault-Tolerant Multilevel Inverter for Improving the Performance of a Pole-Phase Modulated Nine-Phase Induction Motor Drive", IEEE Transactions on Industrial Electronics, vol. 65, No. 2, Feb. 2018, 10 pages.

B. Prathap Reddy et al., "A Three-level Inverter Configuration for Pole-Phase Modulated Nine-Phase Induction Motor Drives with Single DC Link", 2017 National Power Electronics Conference (NPEC), College of Engineering Pune, India, Dec. 18-20, 2017, 6 pages.

B. Prathap Reddy et al., "A Multilevel Inverter Configuration for an Open-End-Winding Pole-Phase-Modulated-Multiphase Induction Motor Drive Using Dual Inverter Principle", IEEE Transactions on Industrial Electronics, vol. 65, No. 4, Apr. 2018, 10 pages.

B. Prathap Reddy et al., "Linear Modulation Range and Torque Ripple Profile Improvement of PPMIM Drives", IEEE Transactions on Power Electronics, vol. 34, No. 12, Dec. 2019, 8 pages, DOI: 10.1109/TPEL.2019.2907782.

K. Sivakumar et al., "A Five-Level Inverter Scheme for a Four-Pole Induction Motor Drive by Feeding the Identical Voltage-Profile Windings From Both Sides", IEEE Transactions on Industrial Electronics, vol. 57, No. 8, Aug. 2010, DOI: 10.1109/TIE.2009.2026763, 9 pages.

B.S. Umesh et al., "Multilevel Inverter Scheme for Performance Improvement of Pole-Phase-Modulated Multiphase Induction Motor Drive", IEEE Transactions on Industrial Electronics, vol. 63, No. 4, Apr. 2016, DOI:10.1109/TIE.2015.2506623, 8 pages.

G. H. Rawcliffe et al., "A 2:1 Pole-Changing Induction Motor of Improved Performance", The Proceedings of the Institution of Electrical Engineers, Papers No. 2399 U, vol. 104, Part A, No. 18, Dec. 1957, 4 pages.

G. H. Rawcliffe et al., "An Asymmetrical Induction-Motor Winding for 6:3:2:1 Speed Ratios", Paper No. 2180 U, Dec. 1956, 13 pages.

Leonard M. Melcescu et al., "A New 4/6 Pole-changing Double Layer Winding for Three Phase Electrical Machines", XIX International Conference on Electrical Machines—ICEM 2010, Rome, 6 pages.

G. H. Rawcliffe et al., "The Development of a New 3:1 Pole-changing Motor", Paper No. 1958 U, Dec. 1955, 11 pages.

Baoming GE et al., "Winding Design, Modeling, and Control for Pole-Phase Modulation Induction Motors", IEEE Transactions on Magnetics, vol. 49, No. 2, Feb. 2013, DOI:10.1109/TMAG.2012.2208652, 14 pages.

\* cited by examiner

MULTIPHASE INDUCTION MOTOR DRIVE FOR GEARLESS ELECTRIC VEHICLES

FIELD

Some example embodiments may generally relate to multiphase induction motor drive systems, devices, and methods. Some example embodiments may relate to a gearless powertrain for electric vehicles with the benefits of multiphase induction motor drives.

BACKGROUND

In the present century, concern for ecological systems and the scarcity of fossil fuels have accelerated global research and industrial automobile marketing towards Electric Vehicles (EV) over internal combustion vehicles. The electric drive, including motor and power electronic converter, can be consider the backbone of the EVs. The electric drive can be used to attain the controlled speed and torque variations. The speed and torque variations can be selected based on the enhanced range of speed-torque profile with high efficiency, high reliability and high power handling capability with minimal volume.

The different machines used for electric vehicles include, for example induction machines (IM), switched reluctance machines (SRMs), permanent-magnet synchronous machines (PMSM), and brushless machines (BLDC). Some of these approaches rely on rare earth magnetic materials or complex construction techniques.

IMs have been viewed as more attractive than the other alternatives, because they do not require rare earth magnetic materials and can be simply constructed and controlled. IMs may also be considered rugged and economical. Thus, IMs may be one of the machines for use in EVs.

SUMMARY

An embodiment may be directed to machine for a drive system of gearless electric vehicle. The machine can include a pole-phase modulation multiphase induction motor. The pole-phase modulation multiphase induction motor can be configured to couple with a drivetrain. The machine can also include a multilevel inverter configured to deliver a plurality of voltages to the pole-phase modulation multiphase induction motor. The machine can further include a controller. The controller can be configured to perform vector control of the multiphase induction motor using indirect field-oriented control.

With a single stator winding, the PPM-based MIM drive of certain embodiments may deliver different torques as well as speeds similar to multispeed gear system, but with a reduced motor size. By contrast, in ordinary powertrains of EVs, the motor rated torque is constant. The powertrain with certain embodiments does not require a gearbox, in contrast to single speed or two speed gearboxes in ordinary powertrains. Thus, the weight and volume of the vehicle may be less, both because of a reduced weight of the machine itself, as well as reduced weight of the gearbox. As compared to the Tesla® Model S, for example, the weight of the proposed power train (gear system, motor drive) may be significantly reduced.

An m-phase multilevel inverter system for pole-phase modulation (PPM) based multiphase induction motor (MIM) drives with indirect field oriented control (IFOC) vector control can be provided in certain embodiments using a split phase winding concept. Such embodiments may provide the required control structure to achieve optimum performance from the developed circuits. Certain embodiments of the inverter may be realized with 2-switch inverter legs and a single DC source, which may reduce the complexity as well as the cost of the inverter. Because of the reduced torque/power per phase, the MIM drive of certain embodiments may be realized with lesser ratings of the semiconductor switches. Certain embodiments may employ a phase grouping concept for the PPM based NPIM drive, which may minimize torque ripple and obtain a wide speed-torque control range. The PPM based NPIM drive of certain embodiments may have higher fault tolerance with respect to battery and semiconductor switches and machine phase windings. The PPM based NPIM drive may be most suitable for ship propulsion, aerospace, and EVs applications.

BRIEF DESCRIPTION OF THE DRAWINGS

For proper understanding of example embodiments, reference should be made to the accompanying drawings, wherein.

DETAILED DESCRIPTION

Figure 1:
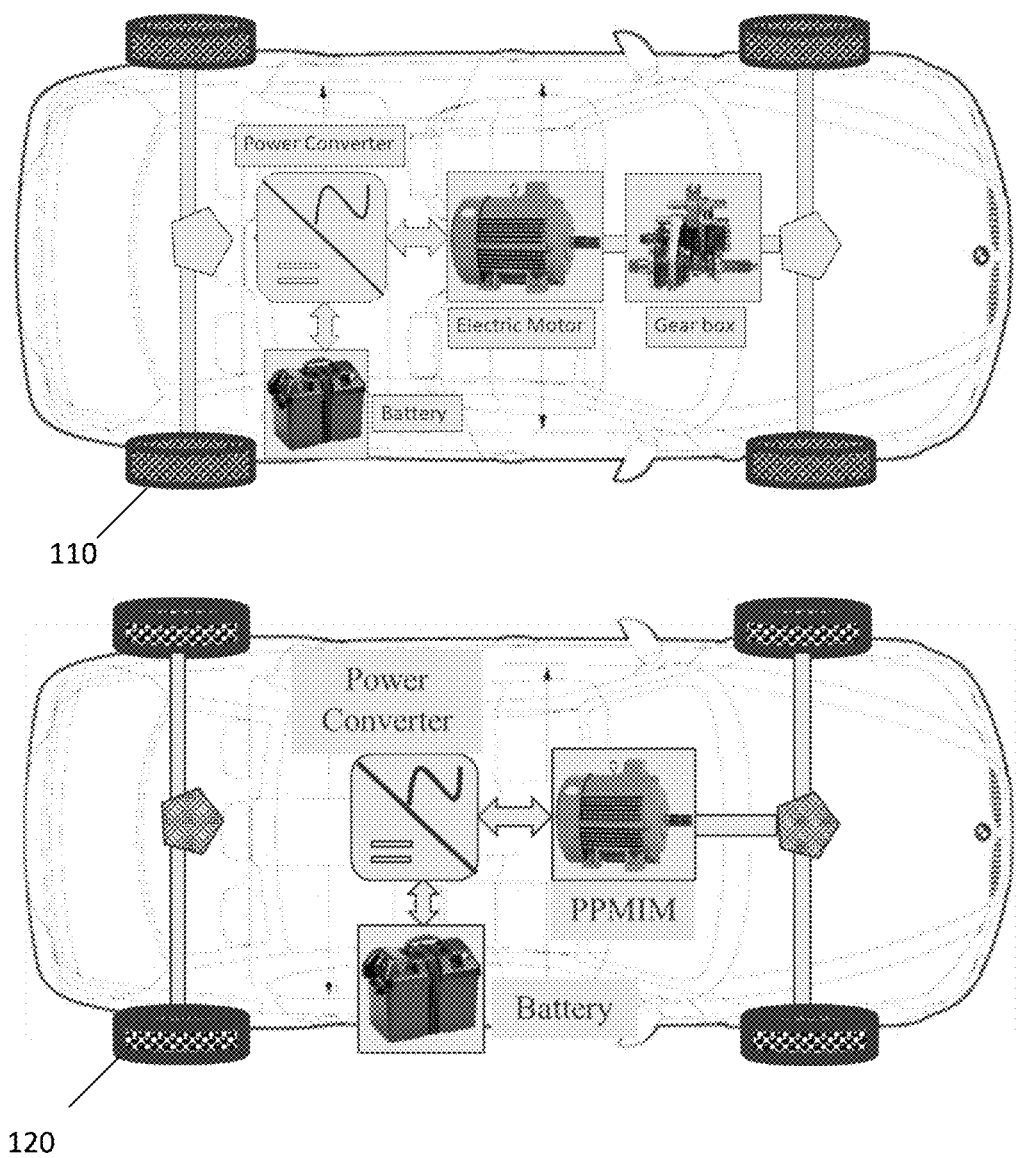
FIG. 1 illustrates a comparison between an electric vehicle with an ordinary induction motor and an electric vehicle with a pole-phase modulation (PPM) based multiphase induction motor (IM) drive, according to certain embodiments.

It will be readily understood that the components of certain example embodiments, as generally described and illustrated in the figures herein, may be arranged and designed in a wide variety of different configurations. Thus, the following detailed description of some example embodiments of a pole-phase modulation based multiphase induction motor and associated control systems thereof, is not intended to limit the scope of certain embodiments but is representative of selected example embodiments.

The features, structures, or characteristics of example embodiments described throughout this specification may be combined in any suitable manner in one or more example embodiments. For example, the usage of the phrases "certain embodiments," "some embodiments," or other similar language, throughout this specification refers to the fact that a particular feature, structure, or characteristic described in connection with an embodiment may be included in at least one embodiment. Thus, appearances of the phrases "in certain embodiments," "in some embodiments," "in other embodiments," or other similar language, throughout this specification do not necessarily all refer to the same group of embodiments, and the described features, structures, or characteristics may be combined in any suitable manner in one or more example embodiments.

Certain embodiments may have various aspects and features. These aspects and features may be applied alone or in any desired combination with one another. Other features, procedures, and elements may also be applied in combination with some or all of the aspects and features disclosed herein.

Additionally, if desired, the different functions or procedures discussed below may be performed in a different order and/or concurrently with each other. Furthermore, if desired, one or more of the described functions or procedures may be optional or may be combined. As such, the following description should be considered as illustrative of the principles and teachings of certain example embodiments, and not in limitation thereof.

A Pole Phase Modulated (PPM) nine-phase induction motor drive according to certain embodiments may be used in gearless electric vehicle applications. With the help of pole changing techniques (like using multiple auxiliary windings or dual stator windings), variable speed and torques can be achieved. Poor copper utilization, de-energization of the windings, and multiple auxiliary windings may still impose significant limitations. In certain embodiments, a single stator winding multiphase induction motor can deliver variable speed-torques by varying the number of phases and poles with respect to the multiphase power converter. Moreover, certain embodiments of the drive may offer high fault-tolerant capability, the ability to handle high power with reduced voltage ratings of power electronic devices, better torque/power distribution, improved efficiency with a lesser magnitude of space harmonics, and other benefits. Certain embodiments of the drive may provide similar speed torque characteristics to internal combustion (IC)-based vehicles, which can help in the elimination of the gearbox system in the EVs. This elimination of the gearbox may also help to minimize the cost, size, weight and volume of the vehicle. A multilevel inverter controlled with carrier phase shifted space vector pulse width modulation (PWM) may help to achieve better performance of the PPM based MIM drive with respect to efficiency, torque ripple, and DC link utilization. This inverter may be realized with 2-switch inverter legs and one DC source, which may reduce the control complexity as well as the cost of the drive. To operate the PPM based MIM drive smoothly in different pole phase combinations, the indirect field oriented vector control is provided in certain embodiments.

The power semiconductor devices of multiphase induction motors (MIMs) may have better power/torque distribution per phase, better fault tolerant capability, higher efficiency and minimized ratings compared with 3-phase IMs. Thus, MIMs may be a useful alternative to 3-phase IMs.

The extended speed-torque profile of drive in MIMs can be achieved by pole-changing techniques, where the stator windings of the IM can be reconfigured in, for example, series-star, parallel-star, parallel-delta, or parallel-series. These pole-changing techniques may require the mechanical re-connection of the windings and de-energization during the transition of one pole to another pole and may result in the under-utilization of copper. These issues may affect the continuity of machine torque and power.

With the enhancement in the power semiconductor technology and micro-controllers, the pole-changing techniques may become cost-effective and efficient solutions for achieving the wider range of speed and torque.

Continuously changing the number of poles may be performed various ways. For example, the number of poles may be continuously changed by varying the supply voltage excitation to respective windings with the help of power electronic converters. This process may be referred to as Pole-Phase Modulation (PPM). PPM can avoid the need to perform winding re-arrangement and de-energization while changing the number of poles.

Certain embodiments relate to the design and implementation of the pole phase-modulated MIM drive for obtaining gearless vehicle operation.

FIG. 1 illustrates a comparison between an electric vehicle with an ordinary IM and an electric vehicle with a PPM-based multiphase IM drive. As shown in FIG. 1 the EV with the ordinary IM 110 can include a battery, a power converter, an electric motor, and a gear box. The EV with the PPM-based based IM drive 120 may likewise have a battery and a power converter. However, the EV with the PPM-based IM drive 120 may include a PPMIM with a clutch.

The EV with the PPM-based IM drive 120 may deliver different torques as well as speeds similar to a multispeed gear system. On the other hand, not shown to scale in FIG. 1, the EV with the PPM-based IM drive 120 may have a reduced size of the motor. In ordinary powertrains of EVs, the motor rated torque may be constant.

The powertrain with the EV with the PPM-based IM drive 120 can avoid the use of a gear box, reducing the size, weight, and maintenance of the vehicle. By contrast, a Nissan LEAF® or Tesla Model S® may have a single speed gear box and a Porsche Taycan® may have a two speed gear box.

Certain embodiments provide a mathematical generalization for changing the number of poles and phases of PPM-based multiphase induction motor drives without altering the physical winding. According to such a generalization, pole and phase adjustments may be performed without the need for mechanical reconnection and de-energizing.

Certain embodiments employ an optimal single stator frame split phase winding. The winding may achieve the different pole phase combinations for getting a wider range of torque-speed characteristics. The winding may also provide an improved performance by exciting each coil of a pole pair with an inverter leg excitation.

With the winding excitation method of certain embodiments, in high pole operation, PPM based MIM drives can supply the high initial torque for fast acceleration and hill-climbing. The rated torque of the motor can be k times greater than the low pole mode, where k=pole ratio, for example 1, 3, 5, or 7. Similarly, in low pole mode the same NPIM drive can supply high speed which is k times greater than the high pole mode.

Certain embodiments implement a power supply arrangement that can rely on a specific inverter topology and associated vector control for PPM based MIM drive with improved performance.

Certain embodiments relate to a pole phase modulated nine-phase induction motor for gearless electric vehicles with improved performance in terms of torque ripple profile, DC link utilization, and efficiency. Certain embodiments relate to a high-power density multiphase induction motor with reduced size and volume, and with a wider speed-torque range capability. The size and capability comparison is relative to an ordinary 3-phase IM drive.

Certain embodiments may be employed in various contexts. For example, certain embodiments may be used in gearless electric vehicles, where certain embodiments can provide different speed and torque capabilities. These capabilities can help to eliminate the need for a transmission system, in particular a gearbox.

Certain embodiments may be used in naval ship propulsion. For example, certain embodiments may offer different torque as well as high fault tolerant capability. Certain embodiments may similarly be used in electric trains and in aerospace vehicles.

Certain embodiments may be used in renewable energy systems, such as wind generation systems, to eliminate mechanical gear systems. Moreover, certain embodiments may be used in heavy cranes and manufacturing industrial equipment. In such implementations, the variable speed and torque capability of certain embodiments may be particularly helpful.

Certain embodiments may have a lower efficiency of the Pole phase modulated NPIM drive during the high pole operation, due to higher magnitude of space harmonics. The efficiency, as well as fault tolerant capability of the drive of certain embodiments, may still be higher than an ordinary 3-phase IM drive.

Certain embodiments may provide a pole phase modulated multiphase phase induction motor drive (PPM based MIM) that can be used for gearless electric vehicle applications. With a single stator winding, certain embodiments of the PPM based MIM drive can deliver different torques as well as speeds similar to a multispeed gear system with a reduced size of the motor. By contrast, ordinary powertrains of EVs may have a constant motor rated torque.

In contrast to ordinary powertrains, the machine of certain embodiments may omit a gear box. For example, certain conventional EV powertrains may include a single speed gearbox or a two-speed gearbox. So the weight and volume of the vehicle that includes certain embodiments of the powertrain can be lower, because of the lower weight of the machine as well as the absence of a gearbox. For example, as compared to an EV with a two-speed gearbox (including gear system and motor drive), the weight of the power train of certain embodiments can be significantly reduced.

Certain embodiments relate to a generalization for a pole phase modulated induction motor drive, which may achieve uniform pole formation.

Certain embodiments provide an m-phase multilevel inverter system for PPM based MIM drives with indirect field oriented control (IFOC) vector control. Such inverter systems may use a split phase winding approach. Certain embodiments may provide control structure to achieve optimum performance from the developed circuits.

Certain embodiments may be implemented with 2-switch inverter legs and a single DC source. Such an approach may provide a reduced complexity and cost of the inverter. Because of the reduced torque/power per phase, certain embodiments of the MIM drive may be realized with lesser ratings of semiconductor switches.

Certain embodiments may apply a phase grouping approach for the PPM based NPIM drive for minimizing the torque ripple and obtaining a wide speed-torque control range.

Certain embodiments may provide a PPM-based NPIM drive that has a higher fault tolerant capability with respect to battery and semiconductor switches and machine phase windings. Such embodiments may be suitable for ship propulsion, aerospace, and EV applications.

PPM can be an effective way to obtain extended speed-torque characteristics, where the phase belt can be adjusted by changing the excitation of power electronic inverter. In PPM, the number of phases and poles can vary perpetually in a constant ratio, for example slots/pole/phase. If Q is the number of stator slots and m is number of phases and 2p is number of poles, a generalization of PPM can be expressed as follows:

$$Q = 2p_1 q_1 m_1 = 2p_2 q_2 m_2 \qquad \text{Equation (1)}$$

$$k = \frac{p_2}{p_1} = \frac{q_1 m_1}{q_2 m_2} \qquad \text{Equation (2)}$$

In equations (1) and (2), p1, m1 and p2, m2 can be the number of pole pairs and the number of phases of the PPM1 (for a synchronous speed) and PPM2 (for another synchronous speed) respectively. The q1 and q2 can be the phase belt of the PPM1 and PPM2 windings, respectively. Equation (2) can provide the pole ratio (k), which can be a positive integer and may always be ≥1 if the windings are wound for low pole mode.

Figure 2A:
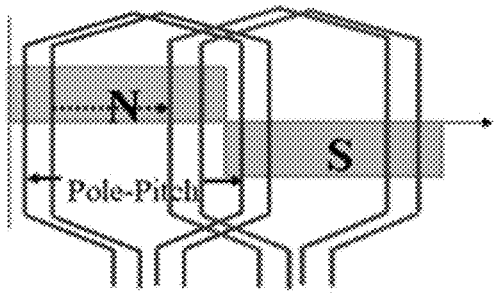
FIG. 2A illustrates a PPM based multiphase IM arrangement for 12-phase IM windings for 2-pole and 4-pole operation with q=2, according to certain embodiments.
Figure 2A:
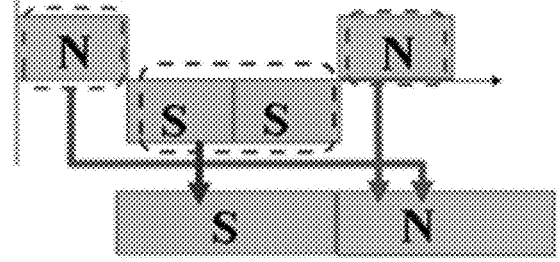
Figure 2B:
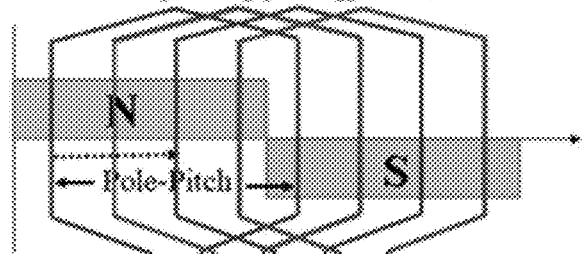
FIG. 2B illustrates a PPM based multiphase IM arrangement for 24-phase IM windings for 2-pole and 8 pole operation with q=1, according to certain embodiments.
Figure 2B:
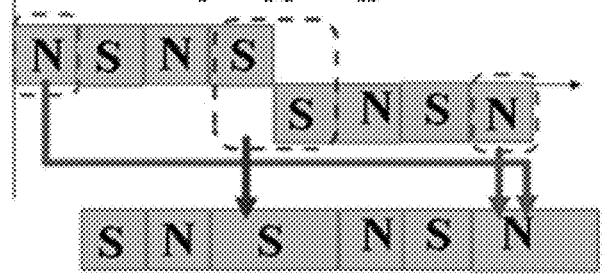
Figure 2C:
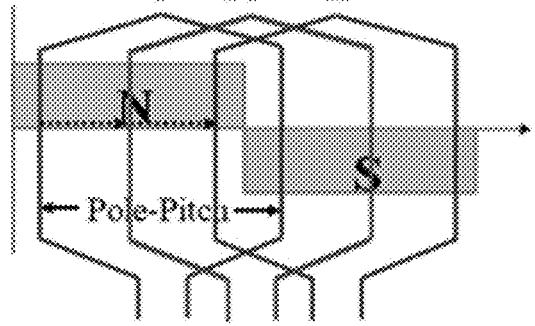
FIG. 2C illustrates a PPM based multiphase IM arrangement for 9-phase IM windings for 2-pole and 6-pole operation with q=2, according to certain embodiments.
Figure 2C:
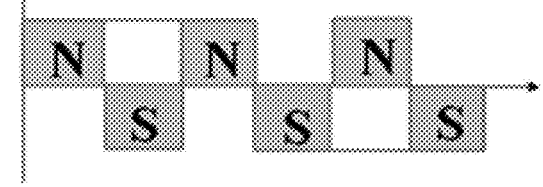

FIG. 2A illustrates a PPM based multiphase IM arrangement for 12-phase IM windings for 2-pole and 4-pole operation with q=2, according to certain embodiments. FIG. 2B illustrates a PPM based multiphase IM arrangement for 24-phase IM windings for 2-pole and 8 pole operation with q=1, according to certain embodiments. FIG. 2C illustrates a PPM based multiphase IM arrangement for 9-phase IM windings for 2-pole and 6-pole operation with q=2, according to certain embodiments.

FIGS. 2A, 2B, and 2C demonstrate that a 48 slot 12-phase/24-phase and 36 slot 9-phase PPM based IM drives can be characterized by the generalization of PPM equations.

From FIGS. 2A and 2B it can be seen that the number of poles have either unchanged/non-uniform widths, which can be viewed as unequal pole widths. These unequal pole widths can lead to unequal flux distributions and high torque pulsations. From FIG. 2C, it can be seen that the 9-phase 36 slot PPM based IM can be characterized by the PPM equations as well. Moreover, using the approach of FIG. 2C, it can be possible to implement uniform pole distributions practically. Thus, if the machine wound for p1 number of pole pairs with p1<p2 then the pole ratio (k) can be an odd positive integer and the pole ratio k can always be ≥2n+1 (where n=0, 1, 2, 3 . . . ). With this revised generalization, symmetrical pole formations with continuity in torque can be achieved. Based on the revised generalization, in certain embodiments, a 1:3 speed ratio of PPM based NPIM is implemented for EV.

Figure 3A:
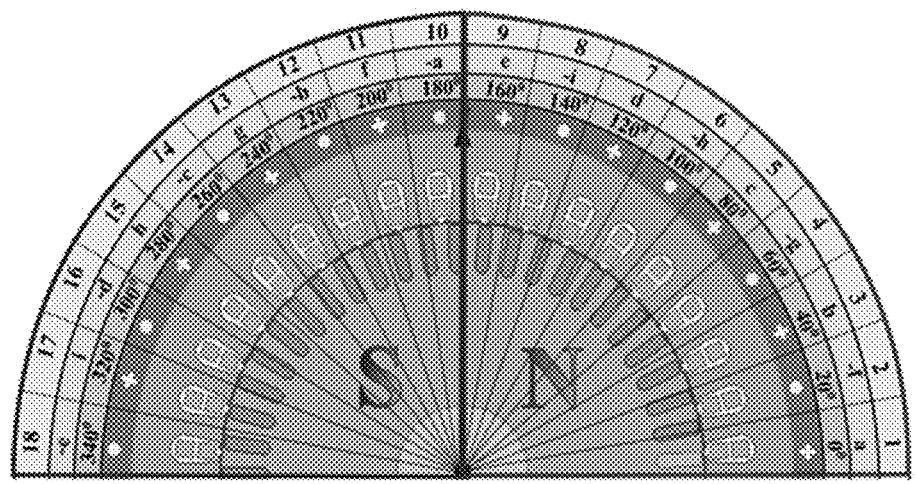
FIG. 3A illustrates PPM details of a nine-phase induction motor (NPIM) drive for half of the stator periphery for a 9 phase (PH)-4 pole (PO) mode, according to certain embodiments.
Figure 3B:
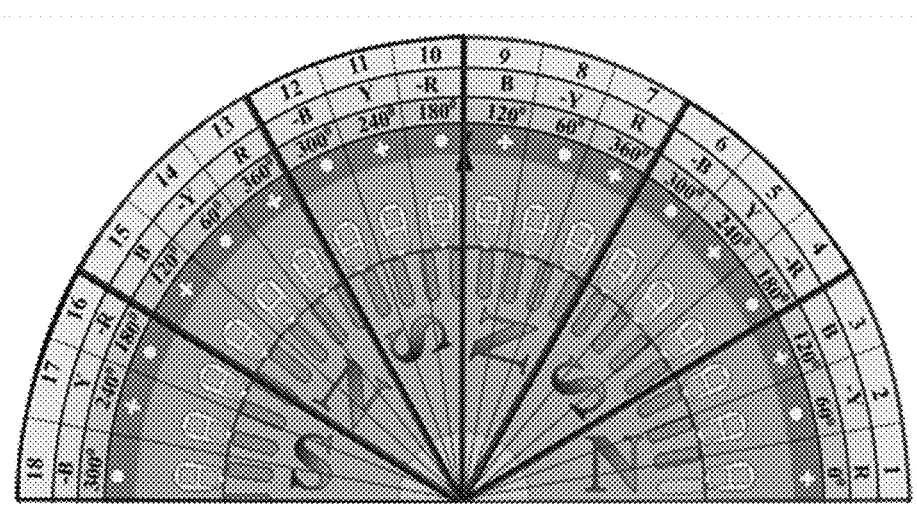
FIG. 3B illustrates PPM details of an NPIM drive for half of the stator periphery for a 3PH-12PO mode, according to certain embodiments.

FIG. 3A illustrates PPM details of an NPIM drive for half of the stator periphery for a 9PH-4PO mode, according to certain embodiments. FIG. 3B illustrates PPM details of an NPIM drive for half of the stator periphery for a 3PH-12PO mode, according to certain embodiments. In certain embodiments, based on the generalization of pole-phase modulation (PPM), a 36-slot nine-phase induction motor (NPIM) drive is provided.

In the PPM based NPIM drives, with the help of multiphase power converters, the order of poles and phases can be modulated without reconfiguring the stator winding arrangement. The phase voltage excitation angles, current direction, winding arrangement for one pole pair (180 degrees of stator circumference) and slot angle for PPM based NPIM are presented in FIGS. 3A and 3B.

The adjacent phase windings of NPIM can respectively get a 40° and 120° displaced supply in 9PH-4PO mode, as shown in FIG. 3A, and 3PH-12PO, as illustrated in FIG. 3B. In certain embodiments, the analysis and design of NPIM are presented as an example model, but the winding design and analysis for the m-phase PPM based IM drive may also be similar to the NPIM.

Figures 4A, 4B:
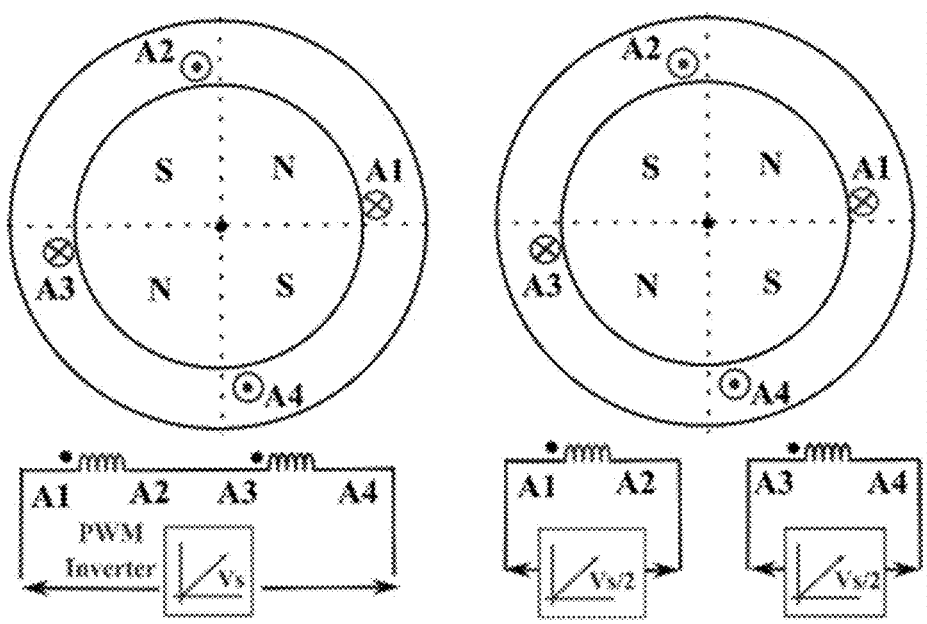
FIG. 4A illustrates a four-stator winding arrangement with an ordinary arrangement.
FIG. 4B illustrates a four-stator winding arrangement with a disconnected coil arrangement, according to certain embodiments.

FIG. 4A illustrates a four-stator winding arrangement with an ordinary arrangement. FIG. 4B illustrates a four-stator winding arrangement with a disconnected coil arrangement.

The 4-pole stator winding arrangement of NPIM drive for phase-a as given in FIG. 4A, where each pole pair one coil, for example A1-A2 for first pole pair and A3-A3 for second pole pair. On the stator circumference, these two coils (A1-A2 and A3-A4) can be connected in series and physically displaced by 360° electrically, as shown in FIG. 4A. The A1-A2 and A3-A4 windings can receive the same fundamental voltage, so these windings can be referred to as identical voltage profile coils (IVPC). In certain embodiments, as shown in FIG. 4B, the 2 IVPCs can be separated and excited with the same fundamental voltage. In this case, the machine parameters like resistance, self-inductance, and air-gap flux distribution may be unaltered as compared with the winding shown in FIG. 4A.

Figure 5A:
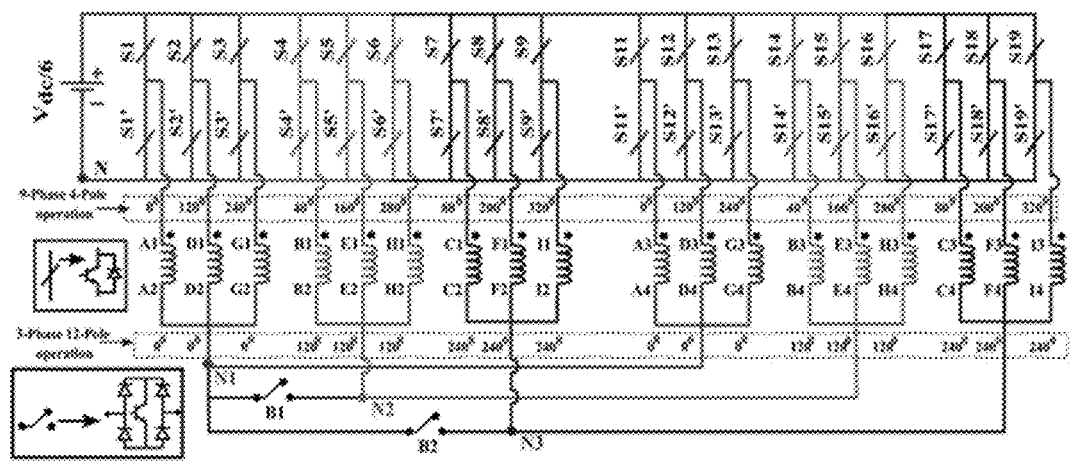
FIG. 5A illustrates a power circuit configuration of a multilevel inverter for PPM based NPIM drive, according to certain embodiments.
Figure 5B:
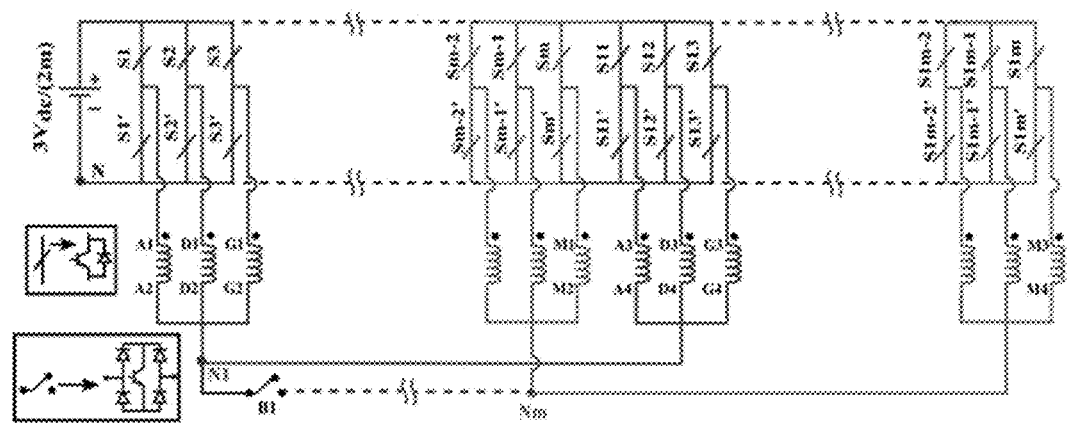
FIG. 5B illustrates a power circuit configuration of a multilevel inverter PPM based multi-phase (m-phase) IM drive, according to certain embodiments.

FIG. 5A illustrates a power circuit configuration of a multilevel inverter for PPM based NPIM drive, according to certain embodiments. FIG. 5B illustrates a power circuit configuration of a multilevel inverter PPM based m-phase IM drive, according to certain embodiments.

With the certain embodiments of the split-winding concept, which can also be referred to as disconnected IVPC windings as illustrated in FIG. 4B above, a multilevel inverter arrangement is provided for PPM based NPIM and m-phase IM drives by using conventional 2-switch inverter legs, as shown in FIGS. 5A and 5B, respectively. The inverter arrangement of certain embodiments may operate using a DC source with a magnitude of Vdc/6. Here Vdc is the rated DC link voltage of 3-phase IM drive, where the voltage applied to each turn can be maintained constant. The effective voltage seen by the effective phase winding can be as follows:

$$V_{\mathit{effphase-a}} = V_{A1-A2} + V_{A3-A4} \qquad \text{Equation (3)}$$

The space vector pulse width modulation (PWM) (SVPWM) modulated NPIM may give an output voltage of 0.507*Vdc, which can indicate an increment in rotor magnetizing inductance (LMR) is 1.54% only as compared to Sine PWM. In certain embodiments, a phase grouping concept can be used to enhance the DC link utilization of a PPM based NPIM drive.

Table 1 illustrates grouping details of a nine-phase induction motor, according to certain embodiments.

TABLE 1

| Operation | | A1-A2 | D1-D2 | G1-G2 | A3-A4 | D3-D4 | G3-G4 | B1-B2 | E1-E2 | H1-H2 | B3-B4 |
|---|---|---|---|---|---|---|---|---|---|---|---|
| | | \multicolumn{6}{c}{Group-1} | | \multicolumn{4}{c}{Group-2} | | | |
| 9PH-4PO mode | Reference waves | 0° | 120° | 240° | 0° | 120° | 240° | 40° | 160° | 280° | 40° |
| | Carrier waves | 0° | 0° | 0° | 180° | 180° | 180° | 0° | 0° | 0° | 180° |
| 3PH-12PO mode | Reference waves | 0° | 0° | 0° | 0° | 0° | 0° | 120° | 120° | 120° | 120° |
| | Carrier waves | 0° | 60° | 120° | 180° | 240° | 300° | 0° | 60° | 120° | 180° |

| Operation | | E3-E4 | H3-H4 | C1-C2 | F1-F2 | I1-I2 | C3-C4 | F3-F4 | I3-I4 |
|---|---|---|---|---|---|---|---|---|---|
| | | \multicolumn{3}{c}{Group-2} | | | \multicolumn{3}{c}{Group-3} | | |
| 9PH-4PO mode | Reference waves | 160° | 280° | 80° | 200° | 320° | 80° | 200° | 320° |
| | Carrier waves | 180° | 180° | 0° | 0° | 0° | 180° | 180° | 180° |

TABLE 1-continued

| | | | | | | | | | |
|---|---|---|---|---|---|---|---|---|---|
| 3PH-12PO mode | Reference waves | 120° | 120° | 240° | 240° | 240° | 240° | 240° | 240° |
| | Carrier waves | 240° | 300° | 0° | 60° | 120° | 180° | 240° | 300° |

A 4-pole NPIM drive can have 18 IVPCs that are grouped as three 3 phase groups, where each 3 phase group has 2 pairs of three 120° displaced windings. For example, Group-1 can have 6 IVPCs namely A1-A2, D1-D2, G1-G2, A3-A4, D3-D4, and G3-G4. Group-2 and Group-3 can be displaced by an angle of 40° with respect to Group-1. Associated phase displacement angle details are presented in FIGS. 2A, 2B, and 2C and Table 1. The IVPCs phase windings set forth in each phase group can utilize 120° displaced excitation. Thus, there can be flexibility to modulate the NPIM with 3-phase SVPWM. This arrangement can enhance the DC link utilization of the NPIM drive by 15.4%, as the possible output voltage of the inverter can be 0.577*Vdc. The neutrals of 3 groups can be isolated for suppressing the circulating currents by using the four-quadrant switches B1 and B2, as shown in FIG. 5A.

The torque pulsations of the PPM based NPIM drive in 3PH-12PO operation may be high due to the higher magnitude of spatial harmonics in the air-gap, since the dominant time harmonics can be 5th and 7th for 3-phase operation. In certain embodiment, a carrier phase shifted PWM (CPS-PWM) for PPM based NPIM can be provided for minimizing the torque pulsations. In 3PH-12PO mode, the IVPC windings present in Group-1 may act as an effective phase (Phase-R) to attain the 3-phase rotating magnetic field. Similarly, the IVPCs associated with Group-2 and Group-3 may act as Phase-Y and Phase-B respectively with 120° phase displacement. Without disturbing the fundamental voltage of the phase windings of Group-1, the respective inverter legs may be modulated 60° (360°/6) phase displaced triangular waves for achieving the multilevel voltage across the Phase-R, as a sum of all 6 IVPC voltages. This CPS-PWM may enrich the harmonic profile of the Phase-R voltage by canceling all harmonics at multiples of the triangular carrier wave frequency, except 6th multiples.

Figure 6A:
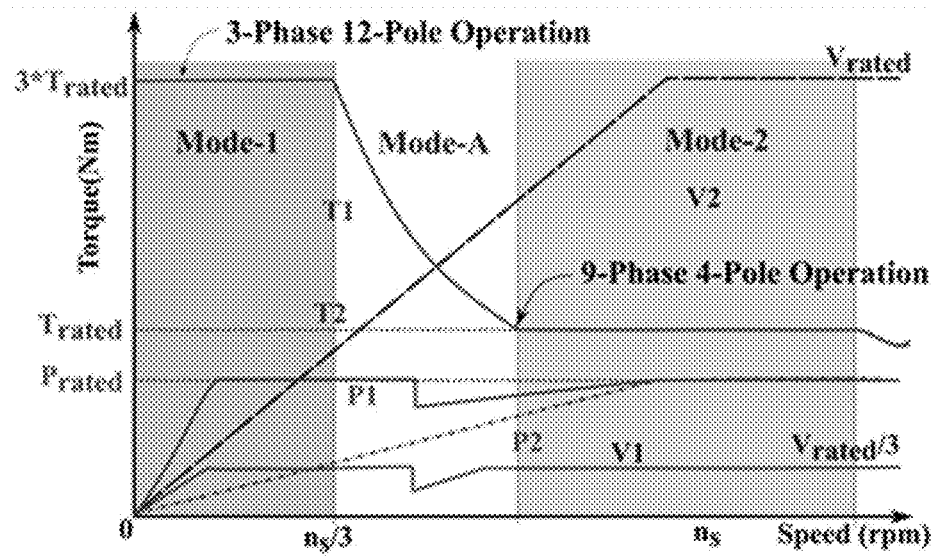
FIG. 6A illustrates a torque versus speed characteristics of a drive for an electric vehicle, according to certain embodiments.
Figure 6B:
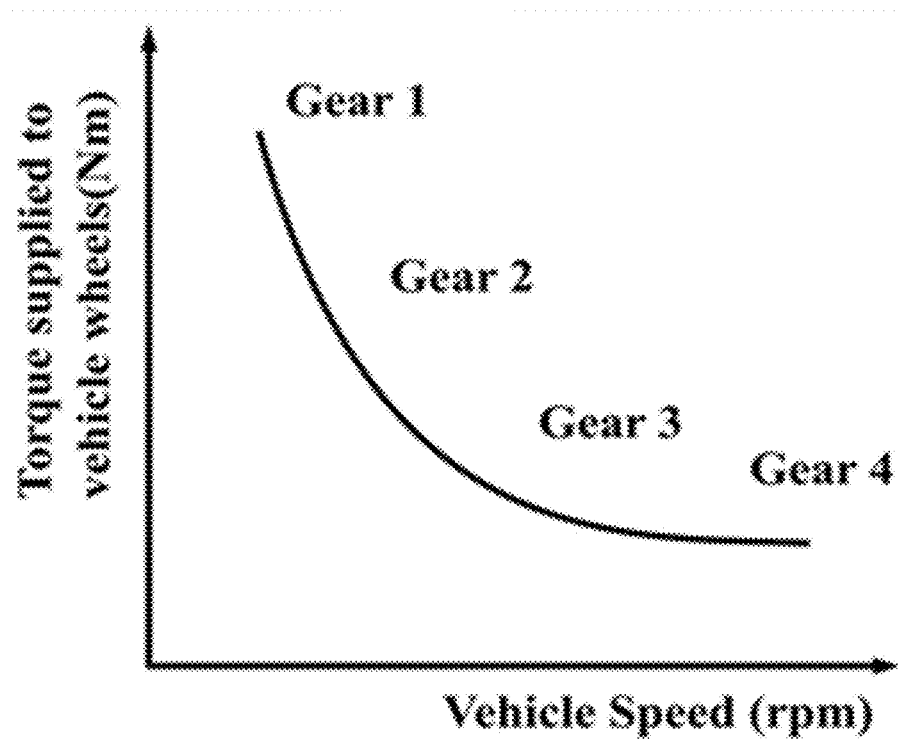
FIG. 6B illustrates a torque versus speed characteristic for a vehicle with an internal combustion engine with a gear box.

FIG. 6A illustrates a torque versus speed characteristics of a drive for an electric vehicle, according to certain embodiments. FIG. 6B illustrates a torque versus speed characteristic for a vehicle with an internal combustion (IC) engine (ICE) with a gear box.

Thus, the torque-speed and power characteristics of the PPM based NPIM drive of certain embodiments (T1, ns & P1) and traditional 2-pole 3-phase IM (T2, ns & P2) with the corresponding excitation phase voltages V1 and V2, respectively, are given in FIG. 6A. In this figure, Trated, Prated and Vrated are the maximum torque, power and voltage ratings of the conservative 2-pole 3-phase IM drive. With the advent of V/f control, 2-pole 3-phase IM facilitates an enhanced range of speed capability but the maximum torque in the entire speed range is unceasing. However, the 36-slot PPM based NPIM drive according to certain embodiments can run at 1:3 speed ratios with the enhanced range of torque characteristics, which may be best suitable for electric vehicles and locomotive applications. The rated torque offered by the PPM based NPIM drive (T1) in 12-pole 3-phase mode, according to certain embodiments, is 3 times higher than the 2-pole 3-phase IM drive (T2), which may assist in meeting high starting prerequisites for traction applications. The voltage rating of the battery (DC link voltage, Vrated) for the drive (V1), according to certain embodiments, can be reduced by 3 times in comparison with 2-pole 3-phase IM drive (V2).

As shown in FIG. 6B, an IC engine based drive can offer high torque in low gear operation, for example in Gear 1, which can be analogous to the 3PH-12PO operation (Mode 1) of the PPM based NPIM drive of certain embodiments. Similarly, Gear 4 can be analogous to the 9PH-4PO mode (Mode 2) of the PPM based NPIM drive of certain embodiments, as observed from FIGS. 6A and 6B. The intermediate speeds (Mode A) of the vehicle (like Gear 2 and Gear 3 speeds) can be achieved by controlling the NPIM drive with V/f=constant or IFOC vector control. The same principles can be extended for getting a higher number of pole-phase combinations with the available slots, which can enrich the range of speed and torque further. For example, a 5 gear equivalent PPM based 45 phase IM drive can be provided for EVs with 90 stator slots.

Certain embodiments of the powertrain may favorably compare to alternative powertrains. For example, in a first example of a powertrain from a 2018 German automobile, the type of machine used was two three-phase permanent synchronous motors. The gear box was a planetary gear design with a single speed transmission in fixed ratio. The transmission in a coaxial arrangement drove the rear axel. The transmission in a parallel arrangement drove the front axle. The approach of this automobile required two motors resulting in a higher size, cost, and weight of the drive. The torque of this automobile was high because of the two motors. High grade permanent magnets were required for this approach. Aging and demagnetization of the permanent magnets will lead to a complete shutdown of this drive. Reliability of this approach is low with respect to the failures of the machine side, due to the three-phase machine, and the battery side.

In another example, in the powertrain of a 2012 US automobile, the type of machine used was two three-phase induction motors. A single gear transmission was used. The drive train was a transverse rear motor providing rear wheel drive. Reliability issues are the same as in the previous example because of the three-phase machine and because of the battery.

In another example, in the powertrain of a 2010 Japanese automobile, the type of machine used was a three-phase permanent magnet synchronous motor. A single speed constant ratio gear box was used. As with the first example, the automobile required high grade permanent magnets, which can suffer from aging and demagnetization, leading to shutdown. Moreover, the same reliability issues exist with respect to the use of a three-phase machine and battery.

In a further example, in the powertrain of a 2016 Korean automobile, the type of machine was a three-phase permanent magnet synchronous motor. A single speed constant ratio gear box was used. Thus, the same issues were present as in the 2010 Japanese automobile.

In an example powertrain of a 2019 German automobile, the type of machine was two AC synchronous electric motors. The automobile included two types of transmission systems, a one-speed direct-drive and a two-speed automatic. This approach offered high torque with reduced size of motor. Nevertheless, higher maintenance was required due to two different gear systems. Furthermore, the same aging and demagnetization issues of magnets issues noted above were also present.

By contrast to the above, certain embodiments provide a multiphase induction motor with gearless operation. Thus, certain embodiments may provide a higher reliability with respect to the faults in machine phases, battery cells, and inverter switches. Moreover, certain embodiments may offer high torque with a reduced size of motor. Furthermore, the issues associated with permanent magnets can be avoided, as permanent magnets are not required. Likewise, no transmission system is required.

Figure 7:
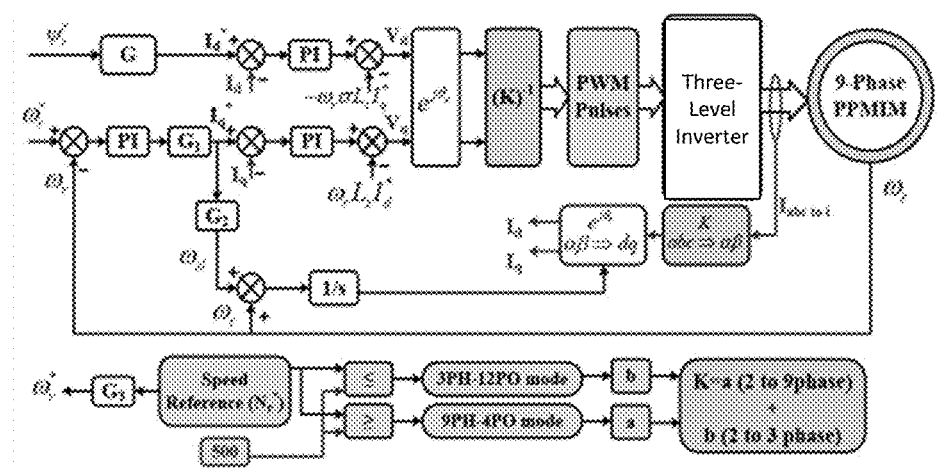
FIG. 7 illustrates indirect field-oriented control (IFOC) of a PPM based NPIM, according to certain embodiments.

FIG. 7 illustrates indirect field-oriented control (IFOC) of a PPM based NPIM, according to certain embodiments. In this vector control, the mode of operation can be selected based on the speed reference (Nr*). The logic of the control can be, for example, the speed <500 rpm yields the 3PH-12PO operation, for example a=0 and b=1, and speed >500 rpm yields the 9PH-4PO operation, for example a=1 and b=0. In this case, a and b can be two variables that are representing the mode of operation. The transformation matrix (K) can be modeled as a combination of both 9 to 2 transformation in 9PH-4PO mode and 3 to 2 transformation, with three sets of 3 phase windings, in 3PH-12PO mode respectively. For example, K can be modelled this way: K=a*(9 to 2 transformation)+b*(3 to 2 transformation) as shown in FIG. 7. However, the transformation matrices for 9 to 2 conversion, 3 to 2 conversion and the detailed modeling of the multiphase machines can also be available. In this IFOC vector control, the Vd and Vq vectors can be attained from the flux component and speed error respectively, which can be transformed into actual modulating vectors of PPM based NPIM drive by taking the inverse transformation of a K matrix.

Figure 8A:
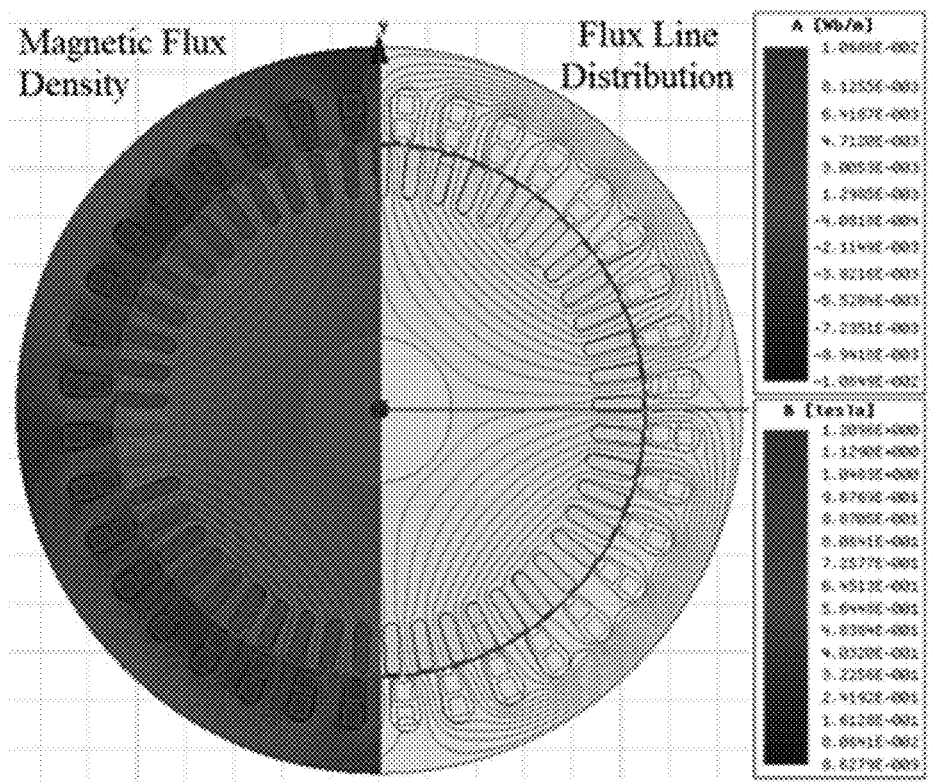
FIG. 8A illustrates magnetic flux density and flux line distribution for 9PH-4PO operation, according to certain embodiments.
Figure 8B:
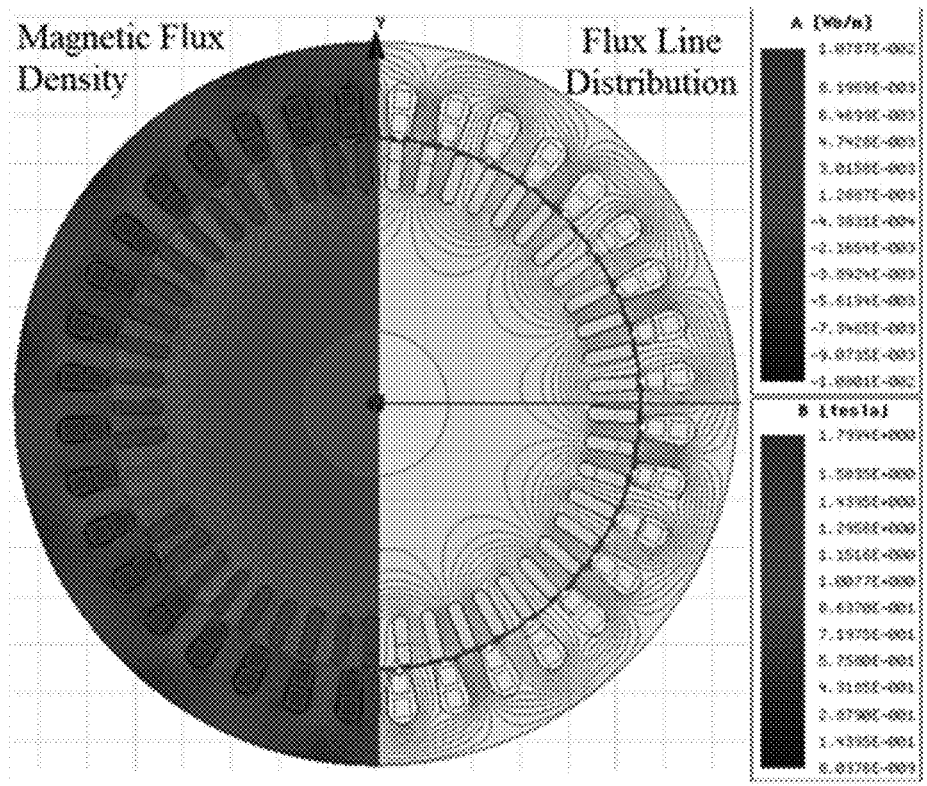
FIG. 8B illustrates magnetic flux density and flux line distribution for 3PH-12PO operation, according to certain embodiments.

A finite element method (FEM) simulation was performed modeling the PPM based NMI drive in Ansys (R) Maxwell 2D electromagnetic software. The higher number of meshing elements of the Maxwell model may ensure the accurate transient analysis of the FEM simulation. FIG. 8A illustrates magnetic flux density and flux line distribution for 9PH-4PO operation, according to certain embodiments. FIG. 8B illustrates magnetic flux density and flux line distribution for 3PH-12PO operation, according to certain embodiments.

FIGS. 8A and 8B illustrate that the poles, as well as phases of the PPM based NPIM, can be varied smoothly in accordance with the inverter excitation of certain embodiments.

Figure 9:
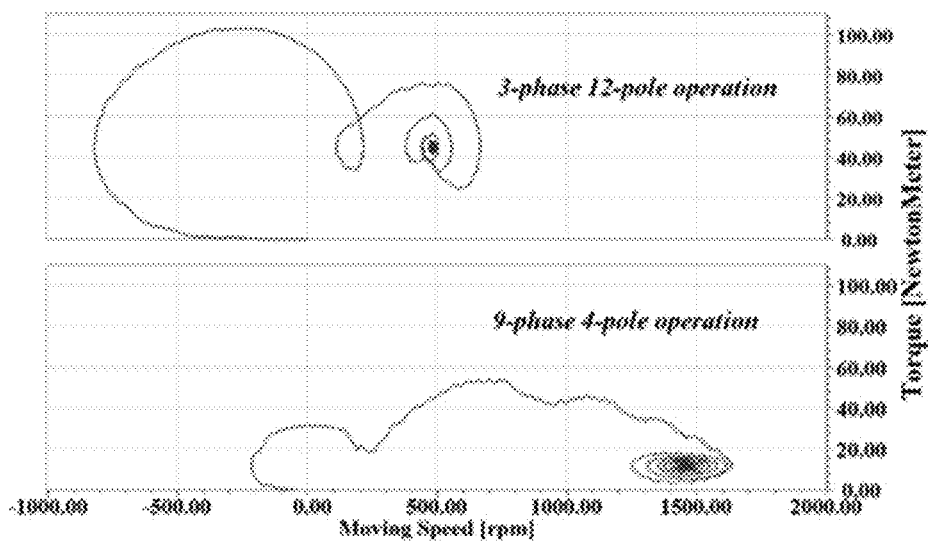
FIG. 9 illustrates torque-speed operating points of a PPM based NPIM, according to certain embodiments.

FIG. 9 illustrates torque-speed operating points of a PPM based NPIM, according to certain embodiments. As can be seen from FIG. 9, the drive may operate at 480 rpm in a 3PH-12PO mode and may operate at 1460 rpm in a 9PH-4PO mode, for a load torque of 45 Nm and 15 Nm, respectively.

Figure 10A:
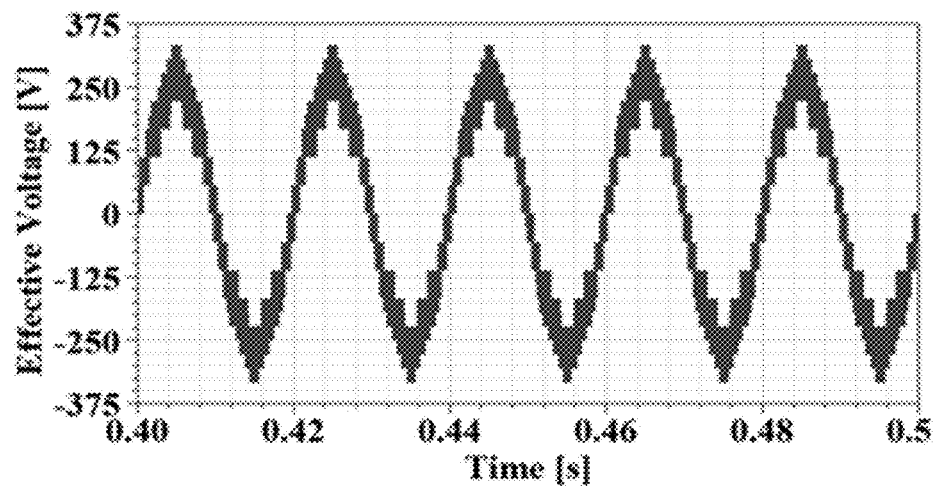
FIG. 10A illustrates effective voltage over time for 3PH-12PO mode, according to certain embodiments.
Figure 10B:
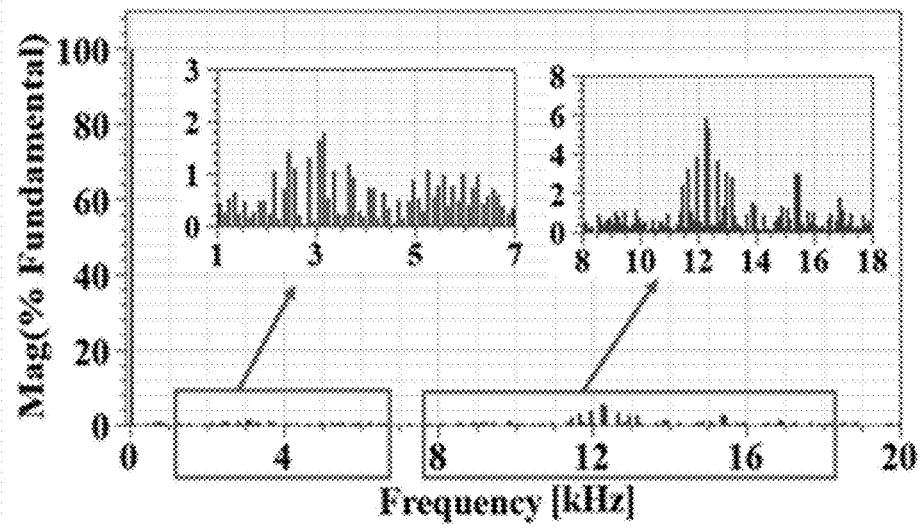
FIG. 10B illustrates a harmonic spectrum of effective Phase-R voltage for 3PH-12PO mode, according to certain embodiments.

FIG. 10A illustrates effective voltage over time for 3PH-12PO mode, according to certain embodiments. More particularly, FIG. 10A illustrates the FEM simulation results in 3PH-12PO mode as to effective Phase-R voltage, as a sum of A1-A2, A3-A4, D1-D2, D3-D4, G1-G2, and G3-G4 IVPC windings. Consistent with the discussion above, a 60° phase shifted carrier SVPWM can be used to modulate the NPIM drive, which may help in getting multilevel voltage across the Phase-R. FIG. 10B illustrates a harmonic spectrum of effective Phase-R voltage for 3PH-12PO mode, according to certain embodiments.

The harmonic spectrum of the Phase-R voltage shown FIG. 10B illustrates that the lower order switching harmonics can be suppressed.

Figure 11A:
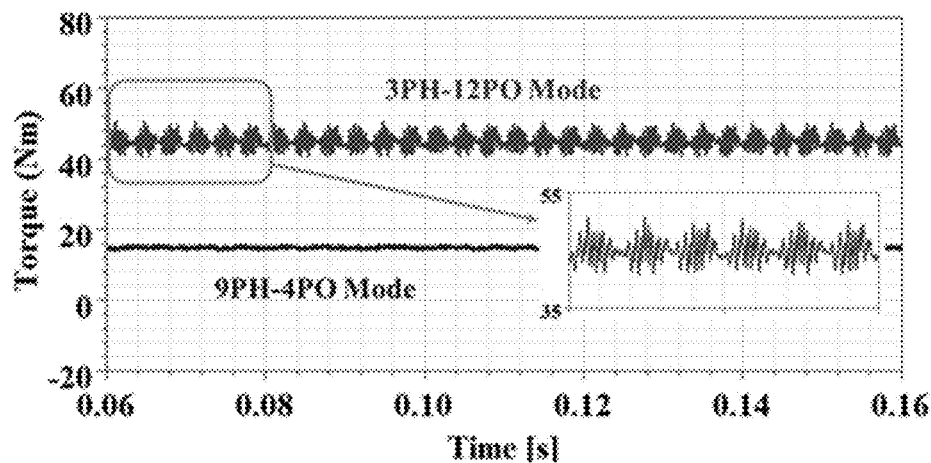
FIG. 11A illustrates a torque ripple profile of a PPM based NPIM drive with 2-level voltage, according to certain embodiments.
Figure 11B:
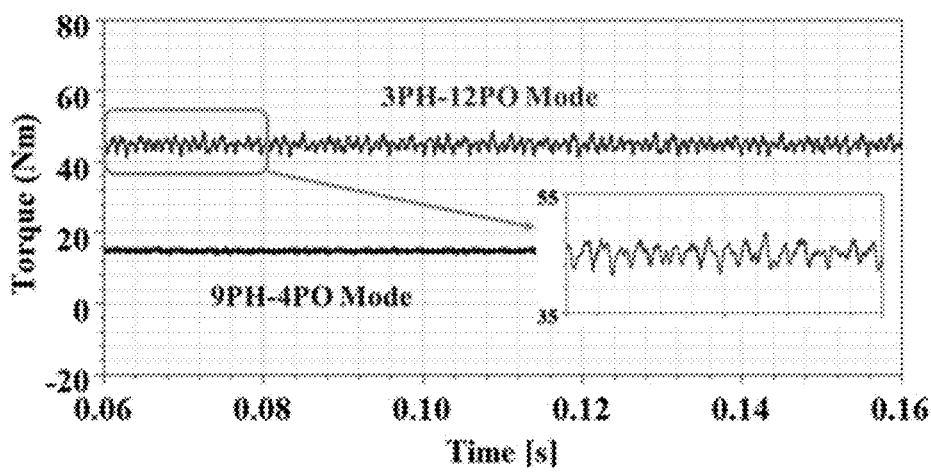
FIG. 11B illustrates a torque ripple profile of a PPM based NPIM drive with an inverter excitation, according to certain embodiments.

FIG. 11A illustrates a torque ripple profile of a PPM based NPIM drive with 2-level voltage, according to certain embodiments. FIG. 11B illustrates a torque ripple profile of a PPM based NPIM drive with an inverter excitation, according to certain embodiments. In this example, a 3-level voltage inverter excitation is illustrated. Because of the suppression of lower order harmonics, the torque ripple profile of the PPM based NPIM drive can be improved as compared to an ordinary two-level inverter, as can be seen from the comparison between FIG. 11A and FIG. 11B.

A 5 hp PPM based NPIM drive can illustrate the workings of certain embodiments. The machine can be wound according to the winding details given in FIGS. 3A, 3B, 4A, and 4B. The Power circuit configuration presented in FIGS. 5A and 5B can be realized with six 3-phase IGBT inverter modules (CCS050M12CM2) and associated gate drives. A field programmable gate array (FPGA) can be used to generate the SVPWM based switching pulses for controlling the MLI. IFOC vector control results of the PPM based NPIM drive during different modes of operation with smooth transient response are presented in FIGS. 12A and 12B, where the output is taken from the DAC.

Figure 12A:
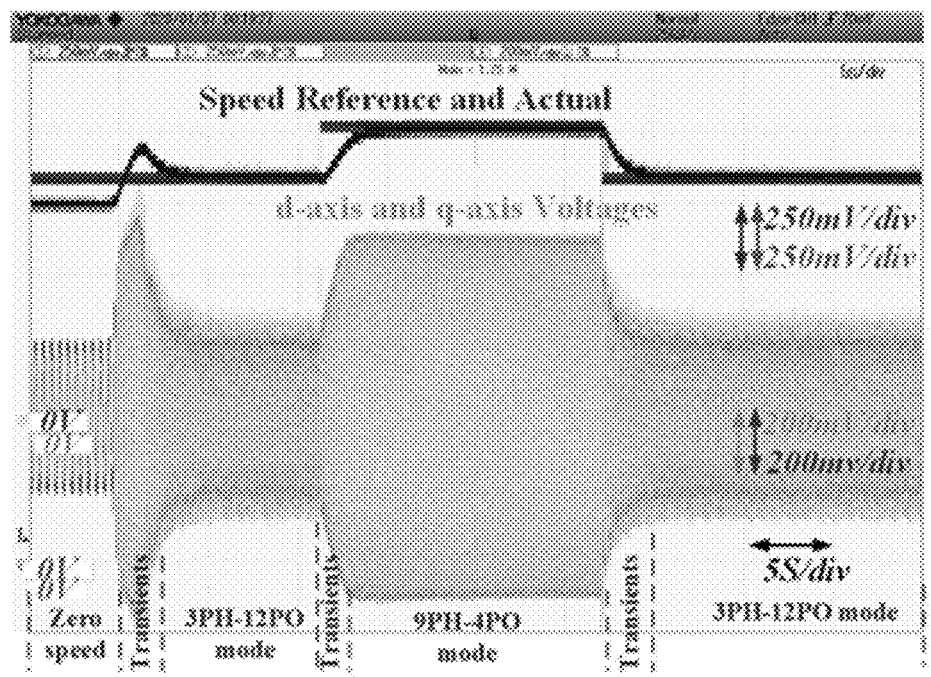
FIG. 12A illustrates experimental results under IFOC vector control with respect to and voltage, according to certain embodiments.

More particularly, FIG. 12A illustrates experimental results under IFOC vector control with respect to and voltage, for example Vα and Vβ. Thus, the speed response of the drive during both 9PH-4PO mode and 3PH-12PO mode is shown in FIG. 12A, where the actual speed accurately tracks both steady-state and transient reference speed.

Figure 12B:
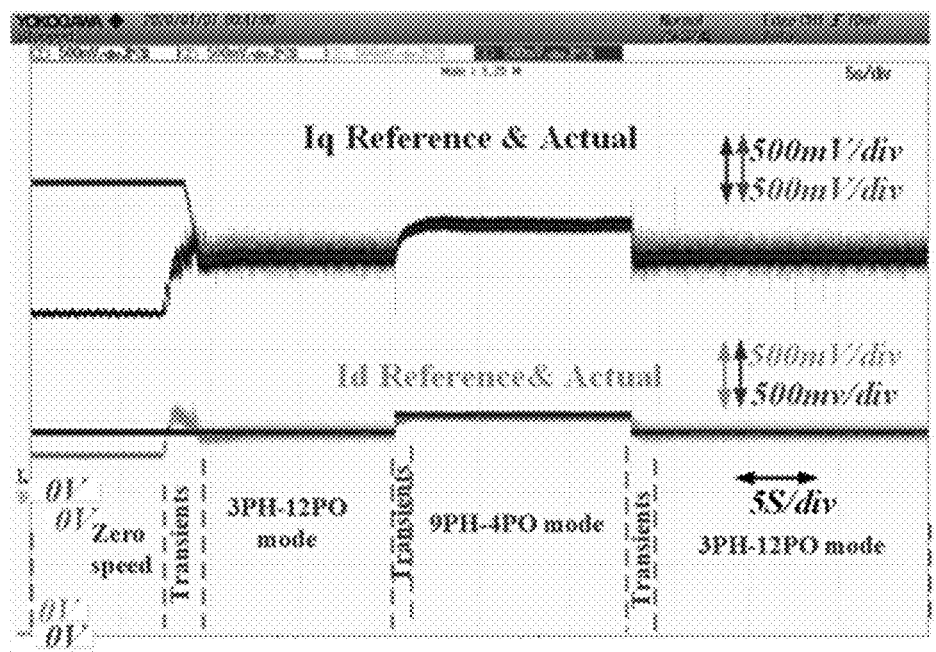
FIG. 12B illustrates experimental results under IFOC vector control with respect to currents, according to certain embodiments.

FIG. 12B illustrates experimental results under IFOC vector control with respect to currents, according to certain embodiments. The currents may be Id and Iq actual and reference currents, for example DAC outputs. As discussed earlier, the torque ripple can be high in 3PH-12PO mode due to the lower order of space harmonics in the airgap MMF. This can be observed in FIG. 12B, because the torque can directly depend on the Iq of the drive. Thus, the Iq ripple can be high for 3PH-12PO mode and low for 9PH-4PO mode.

According to certain aspects, a drive system for a gearless electric vehicle can include a battery, a power converter coupled to the battery, and a pole-phase modulation multiphase induction motor configured to receive power from the power converter. The pole-phase modulation multiphase induction motor can be configured to couple with a drivetrain of the gearless electric vehicle via a clutch. An example of such an implementation is illustrated in FIG. 1B, discussed above, although other implementations are also permitted.

The multiphase induction motor can be a nine-phase induction motor. The nine-phase induction motor may be configured to operate in 9PH-4PO mode and in 3PH-12PO mode, as described above.

The nine-phase induction motor can include a thirty-six slot nine-phase induction motor. As described above, such a motor may support operation in 9PH-4PO mode and in 3PH-12PO mode, consistent with FIGS. 3A and 3B.

The multiphase induction motor can include a multilevel inverter. For example, the multilevel inverter can be a three-level inverter. Thus, certain embodiments may achieve the benefits illustrated by FIG. 11B, discussed above.

The multiphase induction motor can be configured to deliver a plurality of torques with a single stator winding. The multiphase induction motor may also or alternatively be configured to deliver a plurality of speeds with a single stator winding. Examples of various torques are shown in FIG. 6A, for example.

The multiphase induction motor can be configured to deliver power through a drivetrain that lacks a gearbox. Such an approach may allow the motor and the resultant electric vehicle to be lighter and more energy efficient.

The pole-phase modulation multiphase induction motor can be configured to achieve uniform pole formation. The pole-phase modulation multiphase induction motor can also be configured to achieve non-uniform pole formation. These various configurations are illustrated, by way of example, in FIGS. 2A, 2B, and 2C.

The multiphase induction motor can include a split winding. For example, the split winding can be a four-stator winding, as described above with reference to FIG. 4B.

The drive system can also include a controller as illustrated, for example, in FIG. 7. The controller can be configured to perform vector control of the multiphase induction motor using indirect field oriented control. For example, the controller can be configured to perform pulse width modulation to control the multiphase induction motor. More particularly, the pulse width modulation can be a carrier phase shifted pulse width modulation.

The multiphase induction motor can be free from permanent magnets. Thus, reliance on rare earth materials can be reduced, and demagnetization and similar degradation issues can be avoided.

The multiphase induction motor can be configured to operate at a 1:3 speed ratio. In one example, the speed of operation between the two modes of operation, 9PH-4PO mode and in 3PH-12PO mode, can have such a ratio. For example, as illustrated in FIG. 9, the drive may operate at 480 rpm in a 3PH-12PO mode and may operate at 1460 rpm in a 9PH-4PO mode, for a load torque of 45 Nm and 15 Nm, respectively.

In certain aspects, a gearless electric vehicle can include a battery, a power converter coupled to the battery, a pole-phase modulation multiphase induction motor coupled to the power converter, and a transmissionless drivetrain coupled to the pole-phase modulation multiphase induction motor via a clutch. The transmissionless drivetrain can be a drivetrain that omits any gearbox.

The multiphase induction motor can be configured to deliver a plurality of torques and a plurality of speeds with a single stator winding, as described above.

In certain aspects, a machine for a drive system of gearless electric vehicle can include a pole-phase modulation multiphase induction motor. The pole-phase modulation multiphase induction motor can be configured to couple with a drivetrain. The machine can also include a multilevel inverter configured to deliver a plurality of voltages to the pole-phase modulation multiphase induction motor. The machine can further include a controller that can be configured to perform vector control of the multiphase induction motor using indirect field oriented control. The machine can be free from permanent magnets.

Various embodiments may rely on software, for example for control of PPM based NPIM drive. In some example embodiments, an apparatus may include or be associated with at least one software application, module, unit or entity configured as arithmetic operation(s), or as a program or portions of programs (including an added or updated software routine), which may be executed by at least one operation processor or controller. Programs, also called program products or computer programs, including software routines, applets and macros, may be stored in any apparatus-readable data storage medium and may include program instructions to perform particular tasks. A computer program product may include one or more computer-executable components that, when the program is run, are configured to carry out some example embodiments. The one or more computer-executable components may be at least one software code or portions of code. Modifications and configurations required for implementing the functionality of an example embodiment may be performed as routine(s), which may be implemented as added or updated software routine(s). In one example, software routine(s) may be downloaded into the apparatus.

As an example, software or computer program code or portions of code may be in source code form, object code form, or in some intermediate form, and may be stored in some sort of carrier, distribution medium, or computer readable medium, which may be any entity or device capable of carrying the program. Such carriers may include a record medium, computer memory, read-only memory, photoelectrical and/or electrical carrier signal, telecommunications signal, and/or software distribution package, for example. Depending on the processing power needed, the computer program may be executed in a single electronic digital computer or it may be distributed amongst a number of computers. The computer readable medium or computer readable storage medium may be a non-transitory medium.

In other example embodiments, the functionality of example embodiments may be performed by hardware or circuitry included in an apparatus, for example through the use of an application specific integrated circuit (ASIC), a programmable gate array (PGA), a field programmable gate array (FPGA), or any other combination of hardware and software. In yet another example embodiment, the functionality of example embodiments may be implemented as a signal, such as a non-tangible means, that can be carried by an electromagnetic signal downloaded from the Internet or other network.

According to an example embodiment, an apparatus, such as a node, device, or a corresponding component, may be configured as circuitry, a computer or a microprocessor, such as single-chip computer element, or as a chipset, which may include at least a memory for providing storage capacity used for arithmetic operation(s) and/or an operation processor for executing the arithmetic operation(s).

Example embodiments described herein may apply to both singular and plural implementations, regardless of whether singular or plural language is used in connection with describing certain embodiments. For example, an embodiment that describes operations of a single motor may also apply to example embodiments that include multiple instances of the motor, and vice versa.

One having ordinary skill in the art will readily understand that the example embodiments as discussed above may be practiced with procedures in a different order, and/or with hardware elements in configurations which are different than those which are disclosed. Therefore, although some embodiments have been described based upon these example embodiments, it would be apparent to those of skill in the art that certain modifications, variations, and alternative constructions would be apparent, while remaining within the spirit and scope of example embodiments.

We claim:

1. A drive system for a gearless electric vehicle, comprising:
   a battery;
   a power converter coupled to the battery; and
   a pole-phase modulation multiphase induction motor configured to receive power from the power converter, wherein the pole-phase modulation multiphase induction motor is configured to couple with a drivetrain of the gearless electric vehicle, and the drivetrain directly drives wheels of the gearless electric vehicle.

2. The drive system of claim 1, wherein the multiphase induction motor comprises a nine-phase induction motor with pole phase modulation.

3. The drive system of claim 2, wherein the nine-phase induction motor comprises a thirty-six slot, nine-phase and four-pole induction motor.

4. The drive system of claim 1, wherein the multiphase induction motor comprises a multilevel inverter.

5. The drive system of claim 4, wherein the multilevel inverter has a single source and comprises a set of three-level inverters with split windings.

6. The drive system of claim 1, wherein the multiphase induction motor is configured to deliver a plurality of torques with a single stator winding.

7. The drive system of claim 1, wherein the multiphase induction motor is configured to deliver a plurality of speeds with a single stator winding.

8. The drive system of claim 1, wherein the multiphase induction motor is configured to deliver power through a drivetrain that lacks a gearbox.

9. The drive system of claim 1, wherein the pole-phase modulation multiphase induction motor is configured to achieve uniform pole formation.

10. The drive system of claim 1, wherein the multiphase induction motor comprises a split winding.

11. The drive system of claim 10, wherein the multiphase induction motor comprises a four-pole stator winding.

12. The drive system of claim 1, further comprising:
    a controller, wherein the controller is configured to perform vector control of the multiphase induction motor using indirect field oriented control.

13. The drive system of claim 12, wherein the controller is configured to perform pulse width modulation to control the multiphase induction motor.

14. The drive system of claim 13, wherein the pulse width modulation comprises a carrier phase shifted pulse width modulation.

15. The drive system of claim 1, wherein the multiphase induction motor is free from permanent magnets.

16. The drive system of claim 1, wherein the multiphase induction motor is configured to operate at a 1:3 speed ratio.

17. The drive system of claim 1, wherein the multiphase motor is configured to deliver a plurality of toques and a plurality of speeds with a single stator winding, and wherein the multiphase induction motor comprises a nine-phase induction motor that operates at 4-pole 9-phase and 12-pole 3-phase modes.

18. A machine for a drive system of gearless electric vehicle, comprising:
    a pole-phase modulation multiphase induction motor, wherein the pole-phase modulation multiphase induction motor is configured to couple with a drivetrain to drive wheels of the vehicle;
    a multilevel inverter configured to deliver a plurality of voltages to the pole-phase modulation multiphase induction motor; and
    a controller, wherein the controller is configured to perform vector control of the multiphase induction motor using indirect field-oriented control.

19. The machine of claim 18, wherein the machine is free from permanent magnets.

* * * * *